United States Patent
Wang

(10) Patent No.: US 11,153,378 B2
(45) Date of Patent: Oct. 19, 2021

(54) METHOD, DEVICE, AND SCHEDULING SERVER FOR NETWORK RESOURCE ACQUISITION

(71) Applicant: WANGSU SCIENCE & TECHNOLOGY CO., LTD., Shanghai (CN)

(72) Inventor: Bin Wang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 202 days.

(21) Appl. No.: 16/463,732

(22) PCT Filed: Aug. 21, 2018

(86) PCT No.: PCT/CN2018/101521
§ 371 (c)(1),
(2) Date: May 23, 2019

(87) PCT Pub. No.: WO2020/010670
PCT Pub. Date: Jan. 16, 2020

(65) Prior Publication Data
US 2021/0120078 A1    Apr. 22, 2021

(30) Foreign Application Priority Data

Jul. 10, 2018 (CN) .......................... 201810753414.X

(51) Int. Cl.
*H04L 29/08* (2006.01)
(52) U.S. Cl.
CPC .................................. *H04L 67/108* (2013.01)

(58) Field of Classification Search
CPC ..................................................... H04L 67/108
See application file for complete search history.

(56) References Cited

U.S. PATENT DOCUMENTS 9,544,346 B1    1/2017  Chakrovorthy et al.
9,654,360 B1 *  5/2017  Kellicker .............. H04L 43/045
(Continued)

FOREIGN PATENT DOCUMENTS

CN    102868912 A    1/2013
CN    103561049 A    2/2014
(Continued)

OTHER PUBLICATIONS

The European Patent Office (EPO) The Extended European Search Report for 18901810.4 dated Feb. 13, 2020 17 Pages.

(Continued)

*Primary Examiner* — Todd L Barker

(57) ABSTRACT

Method, device and scheduling server for network resource acquisition are provided. The method includes acquiring an initial delivery strategy, the initial delivery strategy including an IP address of at least one CDN node and a quantity of links established with each of the CDN node; according to the initial delivery strategy, determining a size of fragment content corresponding to each of the links that are established with each of the CDN node and an order of use of each of the links; acquiring the fragment content of a corresponding size by sequentially using each of the links according to the order of use; and when a link has completed acquiring the fragment content, sending a fragment request for acquiring the next fragment content to-be-acquired by using the link.

13 Claims, 3 Drawing Sheets

(56) References Cited

U.S. PATENT DOCUMENTS

| | | | |
|---|---|---|---|
| 2008/0002602 A1* | 1/2008 | Chen | H04W 52/146 |
| | | | 370/318 |
| 2012/0096128 A1 | 4/2012 | Maloo | |
| 2013/0046883 A1 | 2/2013 | Lientz et al. | |
| 2015/0237472 A1* | 8/2015 | Alsina | H04W 4/021 |
| | | | 455/456.3 |
| 2016/0197985 A1 | 7/2016 | Watson et al. | |
| 2016/0212056 A1* | 7/2016 | Grosso | H04L 43/0882 |
| 2018/0091618 A1* | 3/2018 | Lee | H04L 65/608 |
| 2018/0332320 A1* | 11/2018 | Barkley | H04N 21/234345 |
| 2019/0075174 A1* | 3/2019 | Todd | H04L 67/306 |

FOREIGN PATENT DOCUMENTS

| | | | | |
|---|---|---|---|---|
| CN | 106993054 A | | 7/2017 | |
| CN | 107786620 A | * | 3/2018 | H04L 29/08 |
| CN | 107786620 A | | 3/2018 | |
| CN | 108076117 A | | 5/2018 | |
| EP | 2545459 A1 | | 1/2013 | |

OTHER PUBLICATIONS

The China National Intelleectual Property Administration (CNIPA) The China Search Report for 201810753414.X dated Dec. 31, 2019 12 Pages.
The World Intellectual Property Organization (WIPO) International Search Report and Written Opinion for PCT/CN2018/101521 dated Apr, 1, 2019 9 Pages.

* cited by examiner

METHOD, DEVICE, AND SCHEDULING SERVER FOR NETWORK RESOURCE ACQUISITION

CROSS-REFERENCES TO RELATED APPLICATIONS

This application is a national phase entry under 35 U.S.C. § 371 of International Application No. PCT/CN2018/101521, filed on Aug. 21, 2018, which claims priority of Chinese patent application No. 201810753414.X, filed with the State Intellectual Property Office of P. R. China on Jul. 10, 2018, the entire contents of all of which are incorporated herein by reference in their entirety.

FIELD OF THE INVENTION

The present invention generally relates to the field of a content delivery technology and, more particularly, relates to a method, a device, and a scheduling server for network resource acquisition.

BACKGROUND

With continuous development of mobile networks, wireless network bandwidth has been continuously increasing. Mobile terminals may acquire a large volume of network resources, such as software installation package, audio, and video, etc. through wireless network. Generally, when the mobile terminal is acquiring a large volume of network resource, the acquisition relies strongly on support from a content delivery network (CDN).

A mobile terminal acquiring a network resource by using a CDN system may include a process of sending an HTTP request from the mobile terminal to a domain name system (DNS) server. After receiving the HTTP request, the DNS server analyzes the domain name in the HTTP request to obtain IP addresses of a plurality of CDN nodes, sends the IP addresses of the CDN nodes to the mobile terminal. The mobile terminal sends fragment requests to each CDN node at their individual IP address respectively, thereby acquiring a complete network resource.

However, among the CDN nodes configured for acquiring the network resource, some CDN nodes may have low service quality. Continuous use of low quality CDN nodes to acquire data may prolong acquisition time for the network resource. Further, a network used by the mobile terminal may not be sufficiently stable, with use of low quality CDN nodes to acquire data, packet loss or delay of data acquisition, etc. may occur.

BRIEF SUMMARY OF THE INVENTION

For solving the above technical problems, embodiments of the present invention provide a method, a device, and a scheduling server for network resource acquisition. The technical solutions may include the following.

A first aspect of the present invention provides a method for network resource acquisition. The method includes:

acquiring an initial delivery strategy, the initial delivery strategy including an IP address of at least one CDN node and a quantity of links established with each of the CDN node;

according to the initial delivery strategy, determining a size of fragment content corresponding to each of the links that are established with each of the CDN node and an order of use of each of the links;

acquiring the fragment content of a corresponding size by sequentially using each of the links according to the order of use; and when a link has completed acquiring the fragment content, determining next fragment content to-be-acquired based on an acquisition rate of the link, and sending a fragment request for acquiring the next fragment content to-be-acquired by using the link. If the next fragment content to-be-acquired is a last fragment content to-be-acquired of a target resource, the step ends, otherwise, the step is repeated.

A second aspect of the present invention provides a method for network resource acquisition. The method includes:

receiving an HTTP request sent by a mobile terminal;

determining an initial delivery strategy based on the HTTP request and a history delivery strategy, the history delivery strategy including a final delivery strategy sent by a history mobile terminal after a resource acquisition; the final delivery strategy including information of the resource, a network status of the history mobile terminal, a geographic position of the history mobile terminal, and an acquisition rate of each of the CDN node during acquisition of a complete resource; and the initial delivery strategy including an IP address of at least one CDN node and a quantity of links established with each CDN node of the at least one CDN node; and sending the initial delivery strategy to the mobile terminal.

A third aspect of the present invention provides a device for network resource acquisition. The device includes:

a first acquisition unit, configured for acquiring an initial delivery strategy, the initial delivery strategy including an IP address of at least one CDN node and a quantity of links established with each of the CDN node;

a determination unit, configured for, according to the initial delivery strategy, determining a size of fragment content corresponding to each of the links that are established with each of the CDN node and an order of use of each of the links;

a second acquisition unit, configured for acquiring the fragment content of a corresponding size by sequentially using each of the links according to the order of use, when a link has completed acquiring the fragment content, the second acquisition unit is further configured for determining next fragment content to-be-acquired based on an acquisition rate of the link, and sending a fragment request for acquiring the next fragment content to-be-acquired by using the link; and if the next fragment content to-be-acquired is a last fragment content to-be-acquired of the target resource, sending of the fragment request ends, otherwise, when a link has completed acquiring the fragment content, sending of the fragment request continues for acquiring the next fragment content to-be-acquired.

A fourth aspect of the present invention provides a scheduling server. The scheduling server includes:

a receiving unit, configured for receiving an HTTP request sent by a mobile terminal;

a determination unit, configured for determining an initial delivery strategy based on the HTTP request and a history delivery strategy, the history delivery strategy including a final delivery strategy sent by a history mobile terminal after a resource acquisition; the final delivery strategy including information of the resource, a network status of the history mobile terminal, a geographic position of the history mobile terminal, and an acquisition rate of each CDN node during acquisition of a complete resource; and the initial delivery strategy including an IP address of at least one CDN node and a quantity of links established with each CDN node of the at least one CDN node; and a sending unit, configured for sending the initial delivery strategy to the mobile terminal.

The method and devices for network resource acquisition, as disclosed in the embodiments of the present invention, employ multiple sources and multiple channels for network resource acquisition. When acquiring a resource, service quality of each link and each CDN node are perceived in real time. Accordingly, the delivery strategy is adjusted in real time, based on the service quality of each link and each CDN node, and requested target and size of requested content are self-adaptively adjusted, thereby avoiding negative effects from the server, other network causes, or acquisition failure caused by malfunction of a CDN node, and making the most utilization of bandwidth, raising resource acquisition rate, and increasing stability of resource acquisition.

BRIEF DESCRIPTION OF THE DRAWINGS

To more clearly illustrate the technical solutions of the present invention, the accompanying drawings to be used in the description of the disclosed embodiments are briefly described hereinafter. Obviously, the drawings described below are merely some embodiments of the present invention. Other drawings derived from such drawings may be obtained by a person having ordinary skill in the art without creative labor.

DETAILED DESCRIPTION

To more clearly describe the objectives, technical solutions and advantages of the present invention, the present invention is further illustrated in detail with reference to the accompanying drawings in conjunction with embodiments.

Figure 1:
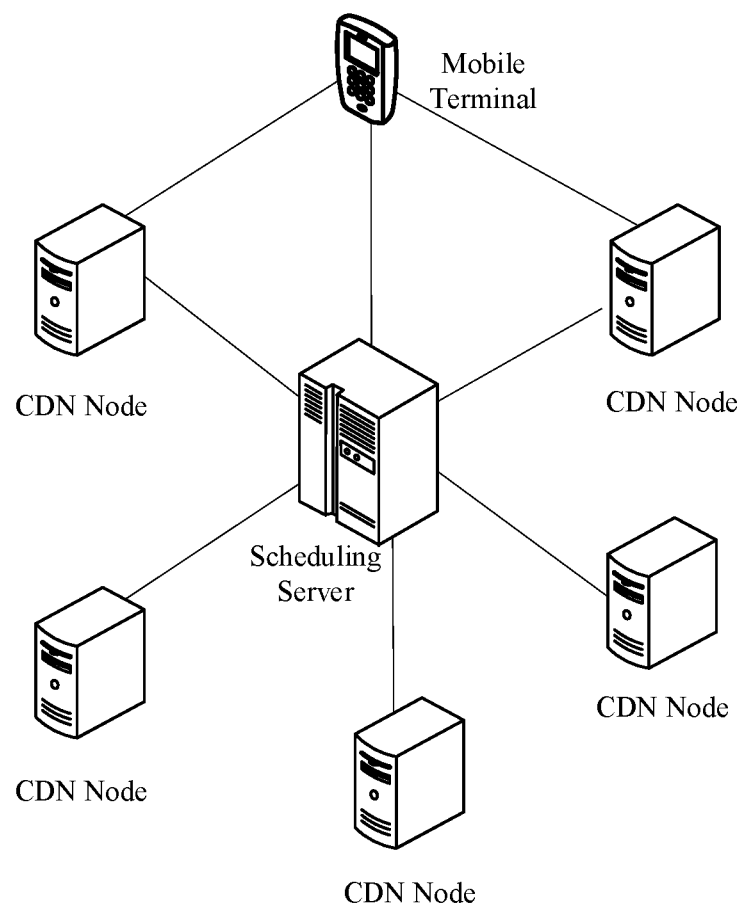
FIG. 1 illustrates a schematic diagram of a network framework according to an embodiment of the present invention.

The present invention provides a method for network resource acquisition, which may be applied to a network framework as illustrated in a schematic diagram of FIG. 1. The network framework includes a scheduling server, a mobile terminal and CDN node(s). The scheduling server is a server in the CDN system to provide a delivery strategy for the mobile terminal. The mobile terminal may be any suitable device that could acquire a network resource through a wireless network, such as a cell phone, a laptop computer, tablet computer, car computer, etc. The CDN node(s) in the network framework may be an individual CDN node, or a CDN server cluster. The CDN node(s) is configured for caching a network resource. After a mobile terminal and one CDN node build a connection, a fragment content or a complete resource may be acquired from the CDN node(s).

After receiving an instruction for acquiring a resource, an application program in the mobile terminal, such as an audio player, or a video player, sends an instruction for acquiring the resource to a software development kit (SDK) in the mobile terminal. After receiving the instruction, the SDK generates and then sends an HTTP request according to the HTTP protocol.

In one embodiment, the mobile terminal may send an HTTP request to the scheduling server. After receiving the HTTP request, the scheduling server sends a delivery strategy to the mobile terminal. The delivery strategy includes an IP address of at least one CDN node, and a quantity of links established with each CDN node. The mobile terminal acquires a fragment content from each CDN node according to the delivery strategy, thereby receiving a complete resource.

Figure 2:
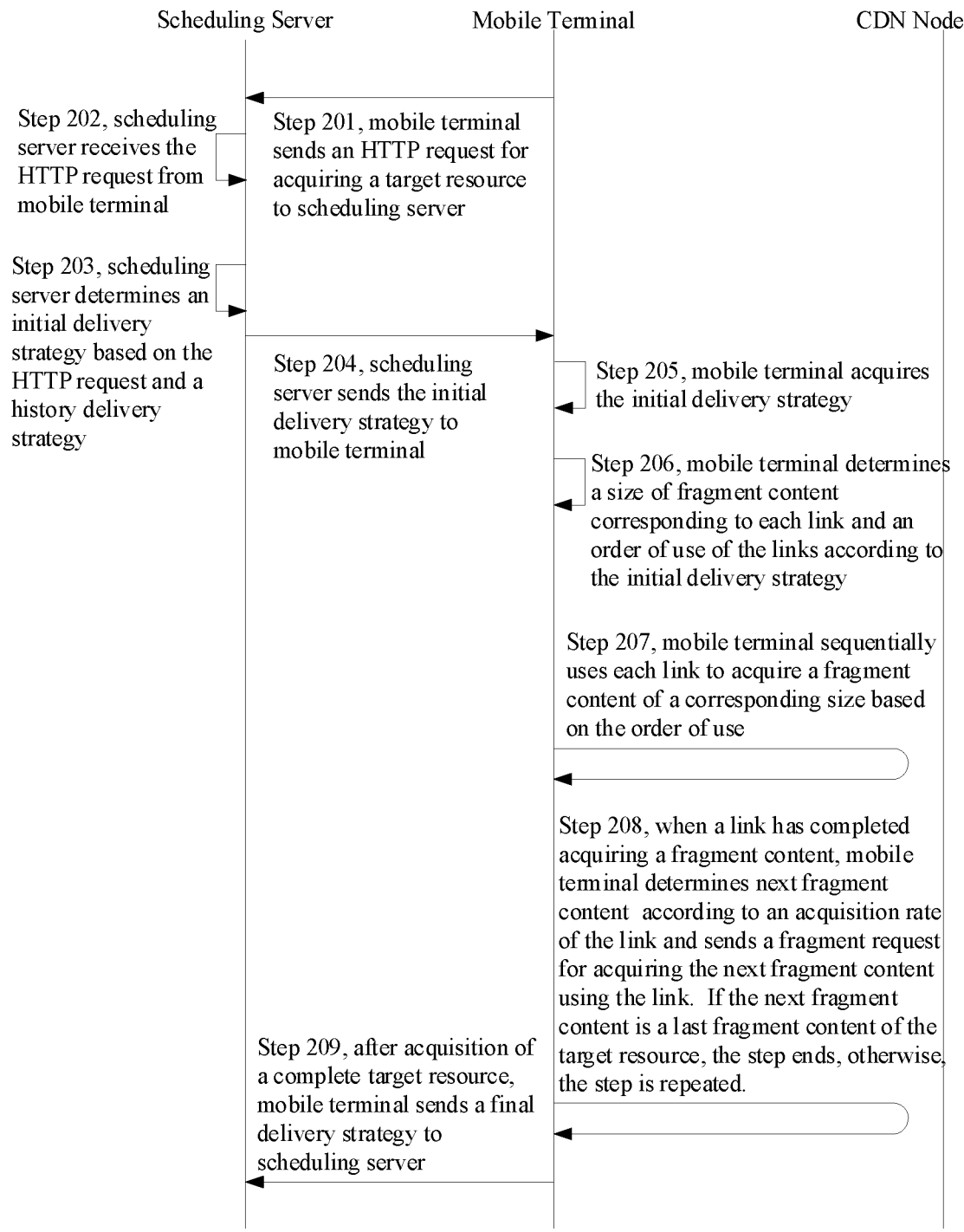
FIG. 2 illustrates flowchart of a method for network resource acquisition according to an embodiment of the present invention.

Referring to FIG. 2, a flowchart of a method for network resource acquisition is provided for the embodiments of the present invention. The method includes following steps:

Step 201, a mobile terminal sends an HTTP request for acquiring a target resource to a scheduling server. In one specific embodiment, the mobile terminal sends the HTTP request to the scheduling server by using an SDK.

Step 202, the scheduling server receives the HTTP request sent by the mobile terminal.

Step 203, the scheduling server determines an initial delivery strategy based on the HTTP request and a history delivery strategy. The history delivery strategy is a final delivery strategy sent by a history mobile terminal after receiving a resource. The final delivery strategy includes information of the resource acquired by the history mobile terminal, network status of the history mobile terminal, geographic position of the history mobile terminal, and acquisition rate of each CDN node during acquisition of a complete resource, which is also the acquisition rate to acquire the fragment content by using each CDN node. The initial delivery strategy includes an IP address of at least one CDN node, and a quantity of links established with each CDN node of the at least one CDN node.

The history mobile terminal is the mobile terminal that sent the final delivery strategy to the scheduling server before a current mobile terminal acquires the initial delivery strategy. The information of the resource includes name, size, and format, etc. of the resource. The network status of the history mobile terminal was the network status when the history mobile terminal was acquiring the resource. The geographic position of the history mobile terminal was the geographic position when the history mobile terminal was acquiring the resource.

When determining an initial delivery strategy based on the HTTP request and a history delivery strategy, the scheduling server may determine an optimal high quality CDN node through domain name analysis in combination with the history delivery strategy. The optimal high quality CDN node, or CDN node with good service quality, refers to a CDN node which delivers the resource with a high acquisition rate. Domain name analysis may determine some CDN nodes close to the mobile terminal in distance, which may be combined with the history delivery strategy to finally determine the optimal high quality CDN node for the mobile terminal to acquire the resource. In a process of determining high quality CDN nodes in combination with the history delivery strategy, the optimal high quality CDN node may be calculated according to a preset algorithm and from various information in the history delivery strategy. When determining a quantity of the links to be established with each CDN node, the quantity of links may depend on the service quality of the CDN node. In general, the better service quality that a CDN provides, the more links would be established with the CDN node.

Step 204, the scheduling server sends the initial delivery strategy to the mobile terminal.

In one embodiment of the present invention, the scheduling server is able to allocate an optimal CDN node with high service quality for the mobile terminal based on the history delivery strategy, thereby causing the mobile terminal to acquire the network resource in the initial acquiring stage using an optimal high quality CDN node, and increasing acquisition rate of the network resource.

Step 205, the mobile terminal acquires the initial delivery strategy.

In specific implementations, the mobile terminal may use a DNS server to receive the initial delivery strategy. The receiving process includes: the mobile terminal sends an HTTP request to the DNS server. After receiving the HTTP request, the DNS server conducts a domain name analysis for the HTTP request to obtain an IP address of at least one CDN node, and then sends the IP address to the mobile terminal. After receiving the IP address of at least one CDN node sent according to the HTTP request from the DNS server, the mobile terminal obtains the initial delivery strategy by determining a quantity of links established with each CDN node based on a preset data and the IP address of at least one CDN node.

Step 206, the mobile terminal determines a size of fragment content corresponding to each of the links established with each of the CDN node and an order of use of each of the links according to the initial delivery strategy.

In various embodiments of the present invention, fragment contents corresponding to each link may have either equal size or unequal sizes. For example, the links may be allocated with fragment contents of different sizes based on the service quality of each CDN node.

In specific implementations, an initial delivery strategy sent by the scheduling server may include a reference fragment size. The mobile terminal may determine the fragment content size corresponding to each link based on the reference fragment size. For example, the fragment size corresponding to each link may be set to the reference fragment size. When determining the reference fragment size, the scheduling server may determine the reference value of the fragment size based on each CDN node and a history delivery strategy both included in the initial delivery strategy. The initial delivery strategy sent by the scheduling server may further include a size of fragment content corresponding to each link.

The mobile terminal may be connected with each CDN node by a plurality of TCP links. The TCP link may be built using a long connection mode for the purpose of reducing time consumption of building or removing the links.

Step 207, the mobile terminal sequentially uses each of the links to acquire a fragment content of a corresponding size according to the order of use.

The mobile terminal may acquire a fragment content based on the initial delivery strategy by a process including: according to the order of use, using a k-th link to send a fragment request for acquiring the fragment content of size corresponding to the k-th link; after receiving the fragment content to-be-acquired using the k-th link, if the k-th link is a last link, the step ends, otherwise, the value 1 is added to the value k, and the step is repeated. The initial value of k is 1.

When acquiring a fragment content according to the initial delivery strategy, the mobile terminal may alternate use of each of the CDN nodes to acquire the fragment content. In other words, in the order of use of the links, any two links to the same CDN node are not configured consecutively. Also, between any two links corresponding to one CDN node may be included a link corresponding to multiple or all of the CDN nodes besides the previous one CDN node. An exemplary process of the mobile terminal acquiring the fragment content according to the initial delivery strategy is described herein. For example, an initial delivery strategy includes CDN node A, CDN node B and CDN node C; and two links established with each of the CDN nodes, correspondingly. An order of use of each of the links is determined as follows: link A1 to CDN node A→link B1 to CDN node B→link C1 to CDN node C→link A2 to CDN node A→link B2 to CDN node B→link C2 to CDN node C. The mobile terminal acquires fragment contents based on the initial delivery strategy by a following process: using link A1 established with CDN node A to send a fragment request for acquiring a fragment content 1 of content size corresponding to the link A1. When having received the fragment content 1 by using link A1, using link B1 established with CDN node B to send a fragment request for acquiring a fragment content 2 of content size corresponding to link B1. When having received the fragment content 2 by using link B1, continuing to use next link to acquire next fragment content to-be-acquired until the fragment content of content size corresponding to link C2 has been acquired by using link C2 established with CDN node C. Then the process ends.

When the mobile terminal is in a process of acquiring a fragment content according to the initial delivery strategy and finds that the fragment content has not been received within a preset time interval after sending a corresponding fragment request to a CDN node, the mobile terminal may deactivate that CDN node, and continue to use another CDN node to acquire the fragment content, thereby avoiding continuous use of a malfunctioning CDN node or a CDN node with low service quality.

Step 208, when a link has completed acquiring a fragment content, the mobile terminal determines next fragment content to-be-acquired according to an acquisition rate of the link and sends a fragment request for acquiring the next fragment content to-be-acquired by using the link. If the next fragment content to-be-acquired is a last fragment content of the target resource, the step ends, otherwise, the step is repeated.

In Step 208, the mobile terminal does not acquire a fragment content of the content size determined according to the initial delivery strategy. Instead, the size of next fragment content to-be-acquired may be adjusted in real time based on the acquisition rate of the link. When determining size of the next fragment content to-be-acquired according to the acquisition rate, the mobile terminal may make the determination according to the acquisition rate by the link in the most recent previous acquisition, or may make the determination according the acquisition rates by the link in the most recent N times of acquisitions, in which N may be any integer greater than 1. When making the determination according to the acquisition rates by the link in the most recent N times of the acquisitions, a weighted average of the acquisition rates may be configured to determine size of the next fragment content to-be-acquired. The more recent the acquisition rate is, the higher is the value that may be assigned to the weighting factor.

It should be noted that in one embodiment of the present invention, the start of Step 208 may not have to be after using a last link to receive the fragment content according to the order of use. Execution of Step 207 and Step 208 may overlap in time. For example, in the above example, when link A1 of CDN node A has completed sending fragment content 1, or when the mobile terminal has received the fragment content 1 by using the link A1, the mobile terminal may continue to determine next fragment content to-be-acquired according to acquisition rate of the fragment content 1 by using the link A1 and send a fragment request for acquiring the next fragment content by using the link A1. When the link A1 of the CDN node A has completed sending the fragment content 1, link B1 of CDN node B may also be configured to acquire fragment content 2 continuously according to the initial delivery strategy. Thus, execution of Step 207 and Step 208 may overlap in time.

The mobile terminal may constantly use an idle link to acquire the fragment content until finally receiving a complete target resource.

The method disclosed in various embodiments may perceive service quality of each link and of each CDN node in real time, thereby allocating corresponding size of the fragment content according to the service quality of each link, and even deactivating a poor service quality link or a CDN node. Accordingly, a content acquisition failure due to a CDN malfunction may be avoided, increasing both bandwidth utilization rate and resource acquiring rate. Because of high resource acquisition rate, even when the mobile terminal is in a network in an unstable state, such as packet loss and acquisition delay, could be avoided, thereby leading to an increased stability of resource acquisition.

During the process of acquiring a target resource, per each time period, the mobile terminal may determine an optimal CDN node according to an acquisition rate of fragment content corresponding to each CDN node, which is the acquisition rate by using each CDN node, and add a link between the mobile terminal and the optimal CDN node; or the mobile terminal may determine a worst CDN node, and deactivate the worst functioning link, which is also the slowest link, between the mobile terminal and the worst CDN node. After adding a link, the mobile terminal may determine whether the added link increases overall acquisition rate of the content and deactivate that link in the case of no increase of the overall acquisition rate. Furthermore, per each time period, the mobile terminal may re-use a deactivated link. During the acquiring process of a target resource, the mobile terminal may perceive service quality of each link and of each CDN node through a self-study in real time, thereby adjusting the quantity of links established with the CDN node on time, increasing usage rate of optimal CDN nodes, making most use of bandwidth, and increasing acquisition rate of the resource.

A target resource acquisition process is described in a following embodiment. In the process, the mobile terminal adjusts the quantity of links between the mobile terminal and CDN nodes in real time.

At a preset time and in every two subsequent detection time intervals from the preset time, the mobile terminal determines a target link to-be-added. The target link may be a deactivated link, or a new link between the mobile terminal and an optimal CDN node, which is also the first CDN node. The first CDN node is the CDN node of the fastest acquisition rate to acquire the fragment content among all of the CDN nodes during the previous detection time interval. Then, the mobile terminal determines next fragment content to-be-acquired according to the acquisition rate of the CDN node, which is connected with the target link, at the previous detection time interval. The mobile terminal acquires the fragment content using the target link. The preset time may be at the end of the first detection time interval or the second detection time interval. If the preset time is at end of the first detection time interval, that is if an ending time is at the end of an odd value of detection time intervals, for example ending at the end of one, three, or five detection time intervals, a target link to-be-added is determined and the target link is configured to acquire the next fragment content. Starting time of the first detection time interval may be the beginning time at which the mobile terminal acquires the target resource, or the first detection time may start at a time after the mobile terminal begins to acquire the target resource. The present invention does not impose a particular restriction on either the starting time or length of the detection time interval. The detection time intervals may be continuous, so that an ending of one detection time interval is the beginning of a next detection time interval. Also, the detection time interval may be discontinuous, so that there is a time gap between the detection time intervals.

When determining an acquisition rate of a CDN node in a detection time interval, the mobile terminal may use a weighted average algorithm method. The determination process includes: firstly, determining the acquisition rate of each fragment content using the CDN node within the detection time interval, determining a weighting factor for each acquisition rate, and calculating a weighted average from all of the acquisition rates. The weighted average is assigned as the acquisition rate of the CDN node. When determining a weighting factor for each acquisition rate, the mobile terminal may determine the weighting factor according to the order of use of acquiring fragment contents. In other words, the later the fragment content is acquired, the higher is the value of the weighting factor for the acquisition rate. The following example describes a process of determining acquiring rate of a CDN node. For example, the mobile terminal uses a CDN node to acquire fragment contents in an order of use arranged from beginning to end as fragment content D1, fragment content D2, and fragment content D3, with an acquisition rate of v1 for D1, v2 for D2, and v3 for D3, and with weighting factors for v1 of a, for v2 of b, and for v3 of c, in which the weighting factors have values with a<b<c.

The acquisition rate of the CDN node is calculated as

Acquisition rate=$(a*v1+b*v2+c*v3)/(a+b+c)$

When determining a target link to-be-added, if a deactivated link exists, the mobile terminal gives priority to the deactivated link. In other words, priority is given to reusing a deactivated link to acquire next fragment content before adding a new link between the mobile terminal and the first CDN node. In an embodiment below, for the sake of an easy description, a detection time interval to determine the target link is called "target detection time interval". The preset time is assigned to the beginning of the first target detection time interval.

At the end of a target detection time interval, the mobile terminal determines an overall acquisition rate within the target detection time interval and determines whether the overall acquisition rate is increased compared with an overall acquisition rate in the previous detection time interval, which is adjacent to the target detection time interval. In the case of no increase of the overall acquisition rate, the mobile terminal deactivates the target link. In the case of an increase of the overall acquisition rate, the mobile terminal deactivates a worst link, which is between the mobile terminal and the second CDN node. The second CDN node is the CDN node of the slowest acquisition rate among all of the CDN nodes configured to acquire fragment contents during the target detection time interval. When deactivating a link between the terminal and the second CDN node, the mobile terminal deactivates the link with the slowest acquisition rate among the links between the terminal and the second CDN node. In the detection time interval, the overall rate of content acquisition by the mobile terminal is the ratio of overall acquired content over the overall detection time.

The following embodiment discloses a method of the mobile terminal adjusting the quantity of links between the mobile terminal and a CDN node in real time during a process of acquiring a target resource. At the end of a detection time interval T1, the mobile terminal determines a target link to-be-added and acquires a fragment content using the target link. At end of the next detection time interval T2 succeeding the detection time interval T1, the mobile terminal determines an overall acquisition rate of the content within the detection time interval T2 and compares this acquisition rate with the previous acquisition rate during the detection time interval T1. In the case of no increase of the acquisition rate in the detection time interval T2, the target link is to be deactivated. In the case of an increase of the acquisition rate at the detection time interval T2, a link with the slowest acquisition rate, between the mobile terminal and the second CDN node, is to be deactivated. At the end of the next detection time interval T3 succeeding the detection time interval T2, the above process is repeated until the mobile terminal has acquired a complete target resource.

At a last stage of acquiring the target resource, or when acquiring residual content of a preset size in the target resource, the mobile terminal may carry out the acquisition in several times with each fragment content size to-be-acquired smaller than any fragment content size acquired before the last stage, thereby avoiding a barrel effect, and decreasing overall waiting time in acquiring the target resource. For example, the size of the residual content may be comparable to each fragment content size acquired before the last stage. In the embodiments of the present invention, there is no particular restriction on size of the residual content. When acquiring a target resource having residual content of a preset size, a self-study may be carried out to adjust the delivery strategy in real time, and to self-adaptively adjust requested target, each fragment content size to-be-acquired, and the quantity of links established with the CDN node, thereby increasing usage rate of optimal high quality CDN nodes and links, making most use of the bandwidth, and increasing acquisition rate of the resource.

Step 209, after acquisition of a complete target resource, the mobile terminal sends a final delivery strategy to the scheduling server, the final delivery strategy including information of the target resource, network status of the mobile terminal, geographic position of the mobile terminal, and acquisition rate of each CDN node during acquisition of the complete target resource. The acquisition rate of each CDN node during acquisition of the complete target resource is an average or a weighted average of acquisition rates of all the fragment contents using that CDN node during acquisition of the complete target resource.

When the scheduling server receives a final delivery strategy from the mobile terminal, the final delivery strategy may be configured as a history delivery strategy to be a basis for determining an initial delivery strategy. The final delivery strategy may enrich the history delivery strategies in the scheduling server and may be further optimized into an initial delivery strategy designed for a mobile terminal.

In specific implementations, the mobile terminal may use an SDK both to send a fragment request and to acquire a corresponding fragment content. The method for network resource acquisition disclosed by the present invention may be configured for any client terminal that could acquire network resources through a CDN system, such as a computer, etc.

The method for network resource acquisition of the present invention is able to perceive service quality of each CDN node in real time, and adjust the delivery strategy based on the service quality of the CDN node in real time, thereby avoiding content acquisition failure due to malfunctioning of a CDN node, making most use of the bandwidth, and increasing acquisition rate of the resource.

Figure 3:
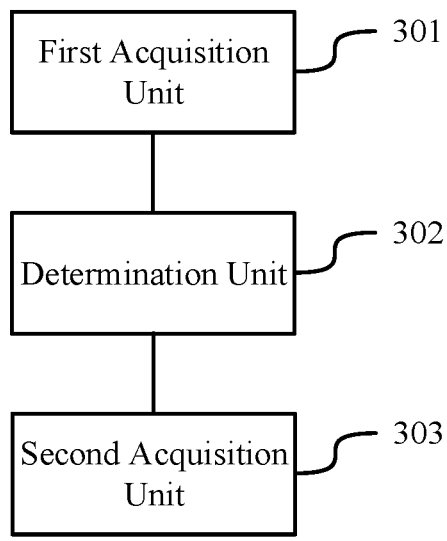
FIG. 3 illustrates structural diagram of a device for network resource acquisition according to an embodiment of the present invention.

Referring to FIG. 3, a structural diagram of a device for network resource acquisition is illustrated for the embodiments of the present invention. The device may be installed in a mobile terminal, or may function as a mobile terminal. The device may include a first acquisition unit 301, a determination unit 302, and a second acquisition unit 303.

The first acquisition unit 301 is configured to acquire an initial delivery strategy, which includes an IP address of at least one CDN node, and a quantity of links established with each CDN node.

The determination unit 302 is configured to determine a size of fragment content corresponding to each of the links, which are established with each of the CDN node, and an order of use of each of the links according to the initial delivery strategy.

The second acquisition unit 303 is configured to acquire, by sequentially using each link according to the order of use, the fragment content of a corresponding content size.

When a link has completed acquiring a fragment content, the second acquisition unit 303 may also be configured for determining next fragment content to-be-acquired, and sending a fragment request for acquiring the next fragment content to-be-acquired by using the link. If the next fragment content to-be-acquired is a last fragment content to-be-acquired in the target resource, sending of the fragment request ends, otherwise, sending of the fragment request is continued for acquiring the next fragment content to-be-acquired.

Optionally, the first acquisition unit 301 may be configured to send an HTTP request to the scheduling server; and to receive an initial delivery strategy sent according to the HTTP request from the scheduling server.

Optionally, the first acquisition unit 301 may also be configured to send an HTTP request to a DNS server; to receive from the DNS server an IP address of at least one CDN node according to the HTTP request; and to acquire an initial delivery strategy determined based on the IP address of at least one CDN node.

Optionally, the second acquisition unit 303 may be configured to send a fragment request using k-th link according to the order of use, and the fragment request is for acquiring a fragment content of content size corresponding to the k-th link. When the fragment content to-be-acquired has been received by using the k-th link, if the k-th link is a last link, the step ends, otherwise, the value 1 is added to the value k, and the step is repeated. The initial value of k is 1.

Optionally, the second acquisition unit 303 may also be configured to determine a target link to-be-added at a preset time and in every two subsequent detection time intervals from the preset time, in which the target link is a deactivated link or a new link between the mobile terminal and the first CDN node; to determine next fragment content to-be-acquired according to an acquisition rate of the CDN node, which is connected with the target link, during the previous detection time interval; and to acquire the fragment content using the target link.

Optionally, the second acquisition unit 303 may also be configured to determine an overall rate of the content acquisition using the target link at the end of the detection time interval; to compare the overall rate with an overall rate at the previous detection time interval, which is adjacent to the detection time interval using the target link. In the case of no increase of the overall rate, the target link is to be deactivated. In the case of an increase of the overall rate, a link between the mobile terminal and a second CDN node is to be deactivated.

Optionally, the second acquisition unit 303 may also be configured to send a final delivery strategy to the scheduling server, the final delivery strategy including information of the target resource, network status of the mobile terminal, geographic position of the mobile terminal, and acquisition rate of each CDN node during acquisition of a complete target resource.

The method and the device for network resource acquisition use multiple sources and multiple channels for acquisition. When acquiring a resource, service qualities of each link and of each CDN node may be perceived in real time. The delivery strategy may be adjusted in real time based on the service quality of each link and CDN node. Requested target and requested content size are self-adaptively adjusted, thereby avoiding negative effects from server and network causes, avoiding failure caused by malfunction of a CDN node, making most use of bandwidth, raising resource acquisition rate, and increasing stability of acquiring a resource.

Figure 4:
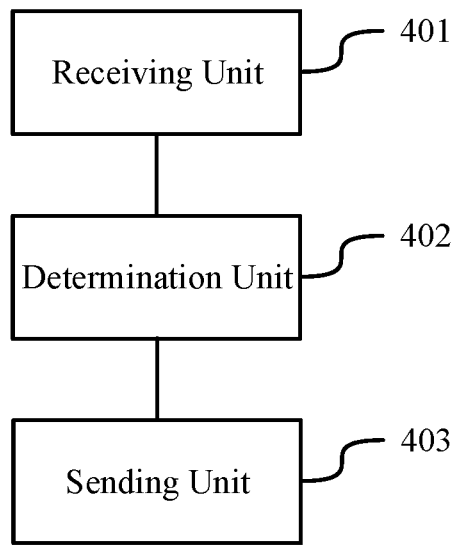
FIG. 4 illustrates structural diagram of a scheduling server according to an embodiment of the present invention.

Referring to FIG. 4, a structural diagram of a scheduling server is provided for the embodiments of the present invention. The scheduling server may include a receiving unit 401, a determination unit 402, and a sending unit 403.

The receiving unit 401 is configured for receiving an HTTP request sent by a mobile terminal.

The determination unit 402 is configured for determining an initial delivery strategy according to the HTTP request and a history delivery strategy, the history delivery strategy including the final delivery strategy sent by a history mobile terminal after receiving a resource. The final delivery strategy includes information of the resource, network status of the history mobile terminal, geographic position of the history mobile terminal, and acquisition rate of each CDN node during acquisition of a complete resource. The initial delivery strategy includes an IP address of at least one CDN node and a quantity of the links established with each CDN node of the at least one CDN node.

The sending unit 403 is configured for sending the initial delivery strategy to the mobile terminal.

Optionally, the receiving unit 401 is also configured for receiving a final delivery strategy from the mobile terminal.

The scheduling server provided in the embodiments of the present invention is able to allocate an optimal high quality CDN node for a mobile terminal based on a history delivery strategy, thereby making the mobile terminal to use the optimal high service quality CDN node for acquiring a network resource at an initial acquisition stage, and increasing the acquisition rate of the network resource.

It should be noted that when a device for network resource acquisition in the above embodiments is acquiring a network resource or a scheduling server is providing an initial delivery strategy, above functional units are differentiated according to different functionalities for exemplification. In practical applications, the above functional allocations may be assigned to different functional units according to needs. In other words, interior structure of the device may be divided into different functional units to perform above described functions completely or partially. Additionally, a device or a scheduling server for network acquisition in the above embodiments results from the same conception as the method for network resource acquisition. Specific application processes of the device and the scheduling server may be referenced from the embodiments about the methods, which are not to be repeated here.

Those skilled in the art may appreciate that the disclosed embodiments may be implemented partially or wholly by a hardware or by using computer programs to instruct hardware(s). The computer programing may be stored in a computer-readable storage medium in a computer. The storage medium may refer to a read-only storage medium, a magnetic disk, or an optical disk.

The foregoing are merely certain exemplary embodiments of the present invention and are not intended to limit the present invention. Without departing from the spirit and principles of the present invention, any modifications, equivalent substitutions, and improvements, etc. shall fall within the scope of the present invention.

What is claimed is:

1. A method for network resource acquisition, applied to a mobile terminal, the method comprising:

acquiring an initial delivery strategy, the initial delivery strategy including an IP address of at least one CDN node, a quantity of links established between each of the at least one CDN node and the mobile terminal, and a reference fragment size;

determining a size of each of fragment contents of a target resource to be obtained over each of the links according to the reference fragment size, and determining an order of use of each of the links according to the IP address of at least one CDN node and the number of links;

acquiring each of the fragment contents of a corresponding size by sequentially using each of the links according to the order of use;

wherein, acquiring each of the fragment contents with a corresponding size by sequentially using each of the links according to the order of use comprises:

when a link has completed acquiring a current piece of the fragment content, determining a size of a next piece of the fragment content to-be-acquired using the link based on an acquisition rate of the link, sending a fragment request for acquiring the next piece of the fragment content to-be-acquired with the determined size by using the link, acquiring the next piece of the fragment content by using the link, and repeating the determining, sending and acquiring processes until completing the acquisition of a last piece of the fragment content, wherein during a process of acquiring the target resource, the method further includes:

at a preset time and in every two subsequent detection time intervals from the preset time, determining a target link to-be-added, wherein the target link is a deactivated link, or a new link between the mobile terminal and a first CDN node, determining next fragment content to-be-acquired according to an acquisition rate corresponding to a CDN node connected to the target link within a previous detection time interval, and acquiring the fragment content using the target link; and after acquiring a complete target resource, sending a final delivery strategy to the scheduling server, the final delivery strategy including information of the target resource, a network status of the mobile terminal, a geographic position of the mobile terminal, and an acquisition rate of each of the at least one CDN node during acquisition of the complete target resource.

2. The method according to claim 1, wherein acquiring the initial delivery strategy includes:
sending an HTTP request to a scheduling server; and
receiving the initial delivery strategy, sent according to the HTTP request from the scheduling server.

3. The method according to claim 1, wherein acquiring the initial delivery strategy further includes:
sending an HTTP request to a DNS server;
receiving an IP address of the at least one CDN node sent according to the HTTP request from the DNS server; and
acquiring the initial delivery strategy, determined based on the IP address of the at least one CDN node.

4. The method according to claim 1, wherein acquiring the fragment content of a corresponding size by sequentially using each of the links according to the order of use includes:
according to the order of use, using a k-th link to send a fragment request, the fragment request being configured for acquiring fragment content of a size corresponding to the k-th link,
after receiving the fragment content to-be-acquired using the k-th link,
ending the step if the k-th link is the last link;
otherwise, adding value one to the value k and repeating the step, wherein the value k has an initial value of 1.

5. The method according to claim 1, after acquiring the fragment content using the target link, further including:
when determining an end of a detection time interval of the target link, determining an overall rate of content acquisition during the detection time interval, and determining whether the overall rate is increased over an overall rate of content acquisition during a previous detection time interval, wherein the determined detection time interval of the target link and the previous detection time interval are adjacent to each other; and
when the overall rate is not increased, deactivating the target link.

6. The method according to claim 5, wherein after determining whether the overall rate is increased over the overall rate of content acquisition during the previous detection time interval, the method further includes:
when the overall rate is increased, deactivating one link between the mobile terminal and a second CDN node.

7. A device for network resource acquisition, applied to a mobile terminal, the device comprising:
a first acquisition unit, configured for acquiring an initial delivery strategy, the initial delivery strategy including an IP address of at least one CDN node, a quantity of links established between each of the at least one CDN node and the mobile terminal, and a reference fragment size;
a determination unit, configured for, determining a size of each of fragment contents of a target resource to be obtained over each of the links according to the reference fragment size, and determining an order of use of each of the links according to the IP address of at least one CDN node and the number of links; and a second acquisition unit, configured for acquiring each of the fragment contents of a corresponding size by sequentially using each of the links according to the order of use,
the device being configured to, when the acquisition of a current piece of the fragment content has been completed by using a link, determine a size of a next piece of the fragment content to-be-acquired using the link based on an acquisition rate of the link, send a fragment request for acquiring the next piece of the fragment content to-be-acquired with the determined size by using the link, acquire the next piece of the fragment content by using the link, repeat the determining, sending and acquiring processes until completing the acquisition of a last piece of the fragment content,
the second acquisition unit is further configured for:
at a preset time and in every two subsequent detection time intervals from the preset time, determining a target link to-be-added, wherein the target link is a deactivated link, or a new link between the mobile terminal and a first CDN node; determining next fragment content to-be-acquired according to an acquisition rate corresponding to a CDN node connected to the target link within a previous detection time interval; and acquiring the fragment content using the target link, and
after acquiring a complete target resource, sending a final delivery strategy to the scheduling server, the final delivery strategy including information of the target resource, a network status of the mobile terminal, a geographic position of the mobile terminal, and an acquisition rate of each of the at least one CDN node during acquisition of the complete target resource.

8. The device according to claim 7, wherein the first acquisition unit is further configured for:
sending an HTTP request to a scheduling server; and
receiving the initial delivery strategy from the scheduling server according to the HTTP request.

9. The device according to claim 7, wherein the first acquisition unit is further configured for:
sending an HTTP request to a DNS server;
receiving an IP address of the at least one CDN node sent according to the HTTP request from the DNS server; and
acquiring the initial delivery strategy, determined based on the IP address of the at least one CDN node.

10. The device according to claim 7, wherein the second acquisition unit is further configured for:
according to the order of use, using a k-th link to send a fragment request, the fragment request being configured for acquiring fragment content of a size corresponding to the k-th link, and
after receiving the fragment content to-be-acquired using the k-th link:
ending the step if the k-th link is the last link; and
otherwise, adding value one to the value k and repeating the step, wherein the value k has an initial value of 1.

11. The device according to claim 7, wherein the second acquisition unit is further configured for:
when determining an end of a detection time interval of the target link, determining an overall rate of content acquisition during the detection time interval, and determining whether the overall rate is increased over an overall rate of content acquisition during a previous detection time interval, wherein the determined detection time interval of the target link and the previous detection time interval are adjacent to each other; and when the overall rate is not increased, deactivating the target link.

12. The device according to claim 11, wherein the second acquisition unit is further configured for:

if it is determined that the overall rate of content acquisition during the detection time interval of the target link is increased over the overall rate of content acquisition during a previous detection time interval, deactivating one link between the mobile terminal and a second CDN node.

13. A scheduling server, comprising:

a receiving unit, configured for receiving an HTTP request sent by a mobile terminal;

a determination unit, configured for determining an initial delivery strategy based on the HTTP request and a history delivery strategy, the history delivery strategy including a final delivery strategy sent by a history mobile terminal after a resource acquisition;

the final delivery strategy including information of the resource, a network status of the history mobile terminal, a geographic position of the history mobile terminal, and an acquisition rate of each of the at least one CDN node during acquisition of a complete resource; and the initial delivery strategy including an IP address of at least one CDN node, a quantity of links established between each of the at least one CDN node and the mobile terminal, and a reference fragment size; and a sending unit, configured for sending the initial delivery strategy to the mobile terminal wherein the mobile terminal is further configured for: at a preset time and in every two subsequent detection time intervals from the preset time, determining a target link to-be-added, wherein the target link is a deactivated link, or a new link between the mobile terminal and a first CDN node; determining next fragment content to-be-acquired according to an acquisition rate corresponding to a CDN node connected to the target link within a previous detection time interval; and acquiring the fragment content using the target link.

* * * * *